United States Patent
Branch et al.

(10) Patent No.: US 11,190,821 B2
(45) Date of Patent: Nov. 30, 2021

(54) METHODS AND APPARATUS FOR ALERTING USERS TO MEDIA EVENTS OF INTEREST USING SOCIAL MEDIA ANALYSIS

(71) Applicant: International Business Machines Corporation, Armonk, NY (US)

(72) Inventors: Joel W. Branch, Hamden, CT (US); Shang Q. Guo, Cortland Manor, NY (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/058,707

(22) Filed: Mar. 2, 2016

(65) Prior Publication Data
US 2017/0257654 A1 Sep. 7, 2017

(51) Int. Cl.
| | |
|---|---|
| *H04N 21/25* | (2011.01) |
| *H04N 21/466* | (2011.01) |
| *H04N 21/258* | (2011.01) |
| *H04N 21/45* | (2011.01) |
| *H04N 21/4788* | (2011.01) |

(Continued)

(52) U.S. Cl.
CPC ......... *H04N 21/252* (2013.01); *G11B 27/031* (2013.01); *H04L 51/24* (2013.01); *H04L 51/32* (2013.01); *H04L 67/10* (2013.01); *H04L 67/125* (2013.01); *H04L 67/22* (2013.01); *H04L 67/26* (2013.01); *H04L 67/2847* (2013.01); *H04N 21/23406* (2013.01); *H04N 21/25891* (2013.01); *H04N 21/42203* (2013.01); *H04N 21/4312* (2013.01); *H04N 21/4532* (2013.01); *H04N 21/4667* (2013.01); *H04N 21/4788* (2013.01); *H04N 21/4882* (2013.01); *H04N 21/84* (2013.01); *H04N 21/8456* (2013.01); *H04N 21/858* (2013.01)

(58) Field of Classification Search
CPC ............... H04N 21/6125; H04N 21/84; H04N 21/4788; H04N 21/25891; H04N 21/4882; H04N 21/8126; H04N 21/44213
See application file for complete search history.

(56) References Cited

U.S. PATENT DOCUMENTS

| | | | |
|---|---|---|---|
| 5,790,935 A | * | 8/1998 | Payton ............... H04N 7/17336 348/E7.073 |
| 8,140,643 B2 | | 3/2012 | Chen et al. |

(Continued)

*Primary Examiner* — Jason Salce
(74) *Attorney, Agent, or Firm* — Ryan, Mason & Lewis, LLP

(57) ABSTRACT

Methods, systems, and computer program products for alerting users to media events of interest using social media analysis are provided herein. A computer-implemented method includes collecting user media preferences indicating events of interest to a given user; buffering at least a portion of media content associated with the collected user media preferences of the given user; monitoring social media for one or more events of interest to the given user based on the collected user media preferences of the given user; identifying at least one event that satisfies one or more predefined interest criteria for the given user based on the monitored social media contributions of other parties and the collected user media preferences of the given user; and notifying the given user of the at least one event of interest.

20 Claims, 5 Drawing Sheets

(51) Int. Cl.
*H04N 21/488* (2011.01)
*H04N 21/84* (2011.01)
*H04N 21/234* (2011.01)
*H04N 21/845* (2011.01)
*H04N 21/422* (2011.01)
*H04N 21/431* (2011.01)
*H04N 21/858* (2011.01)
*H04L 12/58* (2006.01)
*H04L 29/08* (2006.01)
*G11B 27/031* (2006.01)

(56) References Cited

U.S. PATENT DOCUMENTS

| | | | |
|---|---|---|---|
| 8,942,542 B1* | 1/2015 | Sherrets | H04N 21/44008 386/241 |
| 2003/0225777 A1 | 12/2003 | Marsh | |
| 2009/0083321 A1 | 3/2009 | Adams et al. | |
| 2009/0100469 A1* | 4/2009 | Conradt | H04N 7/17318 725/46 |
| 2013/0132481 A1 | 5/2013 | Lee et al. | |
| 2014/0149553 A1* | 5/2014 | Bank | H04L 65/602 709/219 |
| 2014/0156746 A1* | 6/2014 | Wheatley | H04L 67/22 709/204 |
| 2014/0195544 A1 | 7/2014 | Whitman | |
| 2014/0253803 A1* | 9/2014 | Jiang | H04N 5/45 348/565 |
| 2015/0037013 A1 | 2/2015 | Thomas et al. | |
| 2015/0229975 A1* | 8/2015 | Shaw | H04N 21/23439 725/10 |
| 2015/0234820 A1* | 8/2015 | Aravamudan | H04N 21/4668 707/769 |
| 2015/0249852 A1* | 9/2015 | Tang | H04N 21/4753 725/28 |

* cited by examiner

METHODS AND APPARATUS FOR ALERTING USERS TO MEDIA EVENTS OF INTEREST USING SOCIAL MEDIA ANALYSIS

FIELD

The present application generally relates to techniques for presenting media content, and, more particularly, to methods and apparatus for alerting users to events of interest.

BACKGROUND

People often miss captivating events "of interest" in broadcast media (especially live media) while doing something else, such as viewing another program channel. For example, events "of interest" might include an exciting football touchdown by a favorite team or player, an exciting award show performance by a favorite artist, or another unscripted event of interest. By the time people find out about such events "of interest," they have often missed the broadcast of the event and the "replay" may not be available for some time. Often, when such a scenario occurs, people have to wait, for example, until the event is broadcast on the news later, or the event is uploaded to a video sharing website, to view the previous event "of interest."

While a number of techniques exist for recording media according to predefined preferences of a user (such as via a Digital Video Recording (DVR) device), such techniques require that the device be previously programmed to record specified content on a specified schedule. In addition, the National Football League™ (NFL), for example, provides a RedZone' service that broadcasts touchdowns and scores of all NFL games. This service, however, is not personalized and one must constantly watch or record the RedZone™ service to ensure that no events of interest are missed.

A need therefore exists for methods and apparatus for automatically recording media, highlighting or segmenting especially interesting, exciting or thematic portions of the media, and alerting a user about these specially segmented sections of media.

SUMMARY

In one embodiment of the present invention, techniques are provided for alerting users to media events of interest using social media analysis. An exemplary computer-implemented method can include collecting user media preferences indicating events of interest to a given user; buffering at least a portion of media content associated with the collected user media preferences of the given user; monitoring social media for one or more events of interest to the given user based on the collected user media preferences of the given user; identifying at least one event that satisfies one or more predefined interest criteria for the given user based on the monitored social media contributions of other parties and the collected user media preferences of the given user; and notifying the given user of the at least one event of interest.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform the noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes an automated media replay system to alert users to media events of interest using social media analysis. In one or more embodiments, aspects of the invention provide systems, methods and computer program products for automatically recording media, highlighting or segmenting especially exciting or thematic portions of said media, and alerting a user about these specially segmented sections of media. In this manner, aspects of the invention automate delivery of media segments related to events of interest based on personal tastes.

Generally, the events of interest are identified, for example, based on the media preferences of the user and/or real-time social network activity of the user and/or third parties. In at least one embodiment, discussed further below, the media and event preferences of a user are obtained, for example, by monitoring the activities of the user in terms of content watched by the user, browsing history of the user and social network posting history of the user.

In addition, events of particular interest to the user can be identified by evaluating whether potential events satisfy one or more predefined interest criteria, such as the host of a television program that includes the event raising his or her voice in an excited manner above a predefined volume threshold; a volume of crowd noise relating to the event exceeding a predefined noise threshold; a number of social media posts about the event exceeding a predefined posting number threshold; and a predefined action occurring involving a particular person or group (e.g., a favorite player scoring a touchdown or a team winning a particular event).

In one or more embodiments, aspects of the invention provide systems, methods and computer program products for automatically and dynamically providing a user with recorded footage of an event based on his or her explicit or perceived interest in the event as represented by his or her live social network activity. Additionally, social media content as supplied, for example, by "live-bloggers" may describe exciting events, especially televised events, in real time. For example, Twitter and Facebook feeds may be comprised of messages, such as "touchdown again—go San Fran" or "Taylor Swift's performance is amazing." For certain social media contacts, it may be clear that a "friend" relationship is shared, or that a contact or friend shares interests in specific artists or sports teams. Such data can be used to understand what real time social media is particularly relevant or of interest to a certain user. Messages in the social media and other sources can be analyzed to identify the broadcast event that the message refers to. Once the broadcast event is identified, the given user can be alerted that his or her social network has discussed an event that he or she may have missed. The alert optionally includes a recorded segment of the video including the event.

Figure 1:
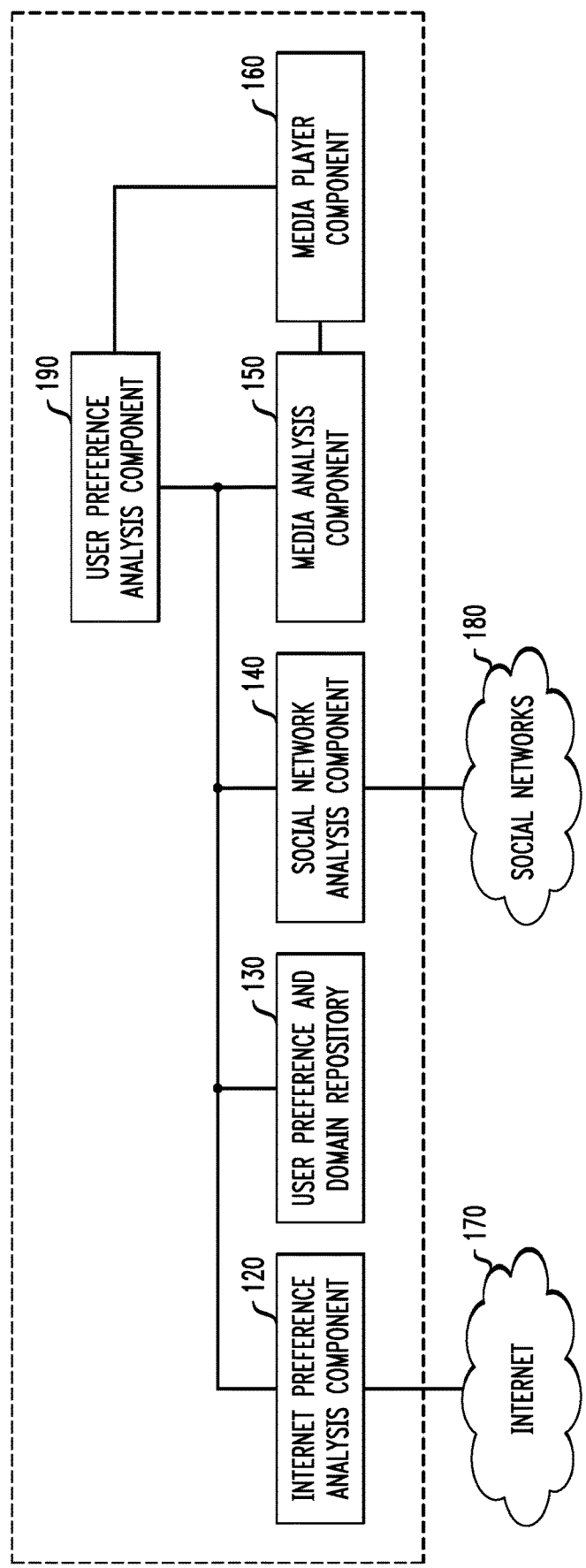
FIG. 1 is a diagram illustrating a system architecture, according to an exemplary embodiment of the invention.

FIG. 1 is a diagram illustrating a system architecture 100, according to an exemplary embodiment of the invention. As shown in FIG. 1, the exemplary system architecture 100 comprises an Internet preference analysis component 120 that analyzes URLs and tags to automatically determine user preferences and interests, based on the browsing history of the user on the Internet 170, as discussed further below in conjunction with FIG. 3. Generally, the Internet preference analysis component 120 analyzes the Internet browsing behavior of a user, such as data obtained from scraping the text from visited web sites, to determine subjects of interests to the user. For example, the frequency of keywords in web page titles, content, and associated with click behavior can be analyzed to determine subjects of interest to the user.

In addition, a user preference and domain repository 130 stores preferences of the user and domains of the user for specific types of media content. As discussed further below, media domains are typically different than preferences. For example, a preference might be a particular performer, such as "Taylor Swift" or "Beyonce," while a media domain (for broadcast media) might be, for example, "music award show" or "music documentary." The user preference and domain repository 130 can store, for example, favorite football teams, musical artists, musical genres, etc. Entries in the repository can be created and updated in alternate ways. For example, the user can explicitly provide preferences to the system. Alternatively, preferences and domains can be learned over time by the system observing the social network behavior of the user. As another alternative, the preferences and domains of the user can also be identified by observing their media viewing habits, as discussed further below. User preference data is continuously supplied by the user preference analysis component 190 and a media analysis component 150 (discussed below).

A social network analysis component 140 analyzes the social network connections and activities of the user on social networks 180 to automatically determine subjects of interest to the user. For instance, if a user subscribes to a social network feed of a sport team (in combination with providing favorable feedback on their content by using, for example, the Facebook™ social networking service "like" button or a similar favorability indication), then the system can determine that the user has a preference for the given team. Such information (e.g., activity data) is sent to the user preference analysis component 190. The social network analysis component 140 also analyzes social network connections and activities in real time to identify comments/ activity that might be associated with media being currently broadcasted. This component can be hosted, for example, by a media distributor.

A media analysis component 150 analyzes broadcasted content of at least one media content provider to find the media segment of a particular event of interest that matches preferences of a user, as well as the predefined interest criteria, such as matching triggering comments related to events from real-time social network activity. A previous recording and/or adequate cache of the broadcasted content can be available in the media analysis component 150 or imported as input from some external source. Once a matching media segment is found, at least one user that has been determined to be interested in the content can be alerted of the matching media segment. Also, the media analysis component 150 analyzes available document data (e.g., web page data) and other associations in order to map user media preferences with media domains. This component is expected to be hosted by a media distributor.

A media player component 160 can be implemented as a hardware or software component that plays media segments obtained from the media analysis component 150. Additionally, the media player component 160 may collect the viewing activity and feedback from the end user. For example, a user interface viewed through the media player component can be used by the end user to rate the degree of interest or preference for a media segment that is shown (e.g., sent by the media analysis component 150). Such information (i.e., in either processed or unprocessed form) is sent to the user preference analysis component 190. The media player component 160 can be, for example, co-located with the "end user" of the system (e.g., a cable television subscriber or mobile phone service subscriber).

An exemplary user preference analysis component 190 jointly analyzes a combination of information from the social network analysis component 140 and the media player component 160 to automatically determine media preferences for end users. In one or more embodiments, data from the Internet 170 is also evaluated. The results of the joint analysis by the social network analysis component 140 and the media player component 160 are user preferences that are sent to the user preference and domain repository 130. The user preference analysis component 190 can be, for example, hosted by a media distributor.

Figure 2:
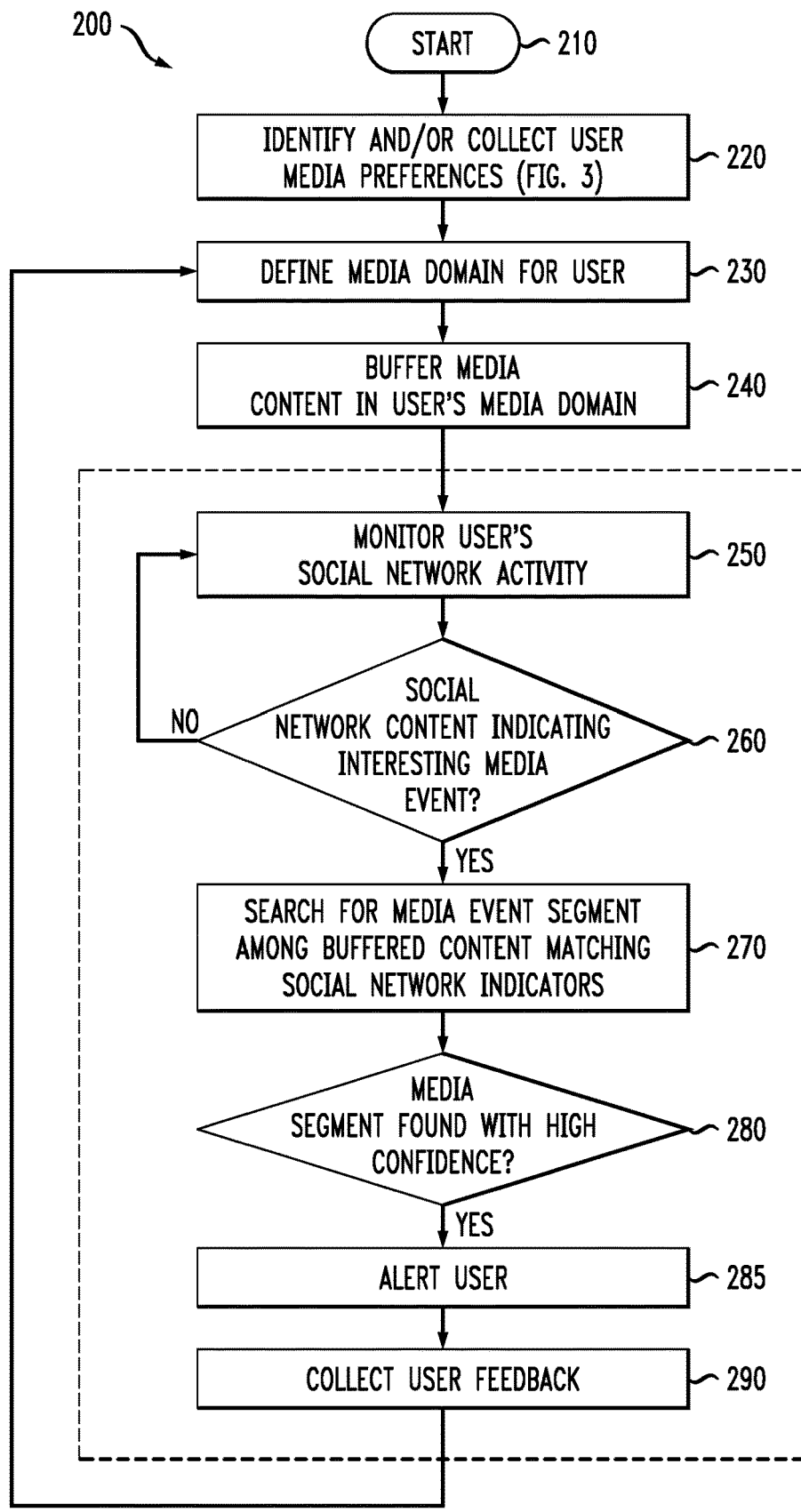
FIG. 2 is a flow chart illustrating an exemplary implementation of an automated media replay process according to one embodiment of the invention.

FIG. 2 is a flow chart illustrating an exemplary implementation of an automated media replay process 200 according to one embodiment of the invention. As shown in FIG. 2, the exemplary automated media replay process 200 is initiated during step 210. During step 220, the automated media replay process 200 identifies and/or collects user media preferences 220, using a user media preference collection process 300, as discussed further below in conjunction with FIG. 3. A preference might include, for example, a favorite performer, sports team or athlete. Explicit media preferences can be collected from the user using a form-based mechanism. Implicit media preferences can be collected from the user by observing media browsing, web browsing, and/or social network activity. In one embodiment, implicit preferences can be defined by extracting annotations from frequently visited content.

In addition, the media domain for the user is defined during step 230. Media domains are typically different than preferences. For example, a preference might be a particular performer, such as "Taylor Swift" or "Beyonce," while a media domain (for broadcast media) might be, for example, "music award show" or "music documentary." Domains are likely more useful to media distributors since domains enable media distributors to use the disclosed techniques to identify content to record based on a potentially wider classification. It is noted that a media domain, such as a media domain of "music award show," can also be a preference (e.g., "Grammys").

It is assumed that the broadcast media is already annotated with such domain classifications (e.g., by owners of the content and program guide provider). A collection of associations between media preferences and media domains can be made explicit (e.g., supplied by content owners) or generated by analyzing other published documents about the media (e.g., collecting published performer/presenter lists for a given award show, or current rosters of players for a given basketball team).

At least a portion of media content belonging to a user's media domain is buffered during step 240, for example, by buffering media content based on the collected user media preferences of other users as a surrogate for a particular user. The social network activity of a user is monitored during step 250. The monitoring during step 250 continues until it is determined during step 260 that there is social network content indicating an interesting media event, based on one or more user media preferences collected during step 220 and one or more predefined interest criteria being satisfied. The predefined interest criteria evaluated during step 260 may comprise, for example, the host of a television program that includes the event raising his or her voice in an excited manner above a predefined volume threshold; a volume of crowd noise relating to the event exceeding a predefined noise threshold; a number of social media posts about the event exceeding a predefined posting number threshold; one or more predefined keywords being stated or presented in the media content itself or in related (and similar) social network feeds about the event (e.g., by analyzing "hash-tagged" comments, or mentions of a given play or player); and a predefined action occurring, involving a particular person or group (e.g., a favorite player scoring a touchdown or a team winning a particular event). In this manner, the social network (and similar) feeds, to which the user subscribes, help identify when an interesting event happens (e.g., by analyzing "hash-tagged" comments and other methods). For example, the system can detect a statement such as "Did you see that play by Beckham! Best play I've ever seen!!," by analyzing "hash-tagged" comments on social media, or mentions of a given play or player during a game. The system may know that a particular user is interested in the New York Giants and/or that favorite player Odell Beckham is a New York Giant and then look for a particular segment of the New York Giants game when an exciting event occurs during a game.

Once it is determined during step 260 that an interesting media event has occurred, then program control proceeds to step 270. During step 270, the automated media replay process 200 searches for the media event segment associated with the interesting media event, based on the matching social network indicators, among the content buffered during step 240.

A test is performed during step 280 to determine if the media event segment is found in the buffered content with a high confidence. If it is determined during step 280 that the media event segment is found with a high confidence, then the user is alerted during step 285. In this manner, the user can be provided with substantially immediate access to the buffered media content associated with the interesting media event identified during step 250. For example, a link can be sent to the given user to enable the user to access the media event segment that was identified during step 270. Alternatively, the media event segment associated with the at least one event of interest can be embedded in the alert sent during step 285, or the media event segment associated with the at least one event of interest can be presented in a pop-up window on a display (e.g., if the user is watching another program at the time). The user can optionally specify a preference for receiving such alerts (e.g., by text message, email, etc.).

User feedback is optionally collected during step 290, for example, to refine the media preferences of the user collected during step 220, and/or the one or more predefined interest criteria employed in step 260. Program control then returns to step 230.

Figure 3:
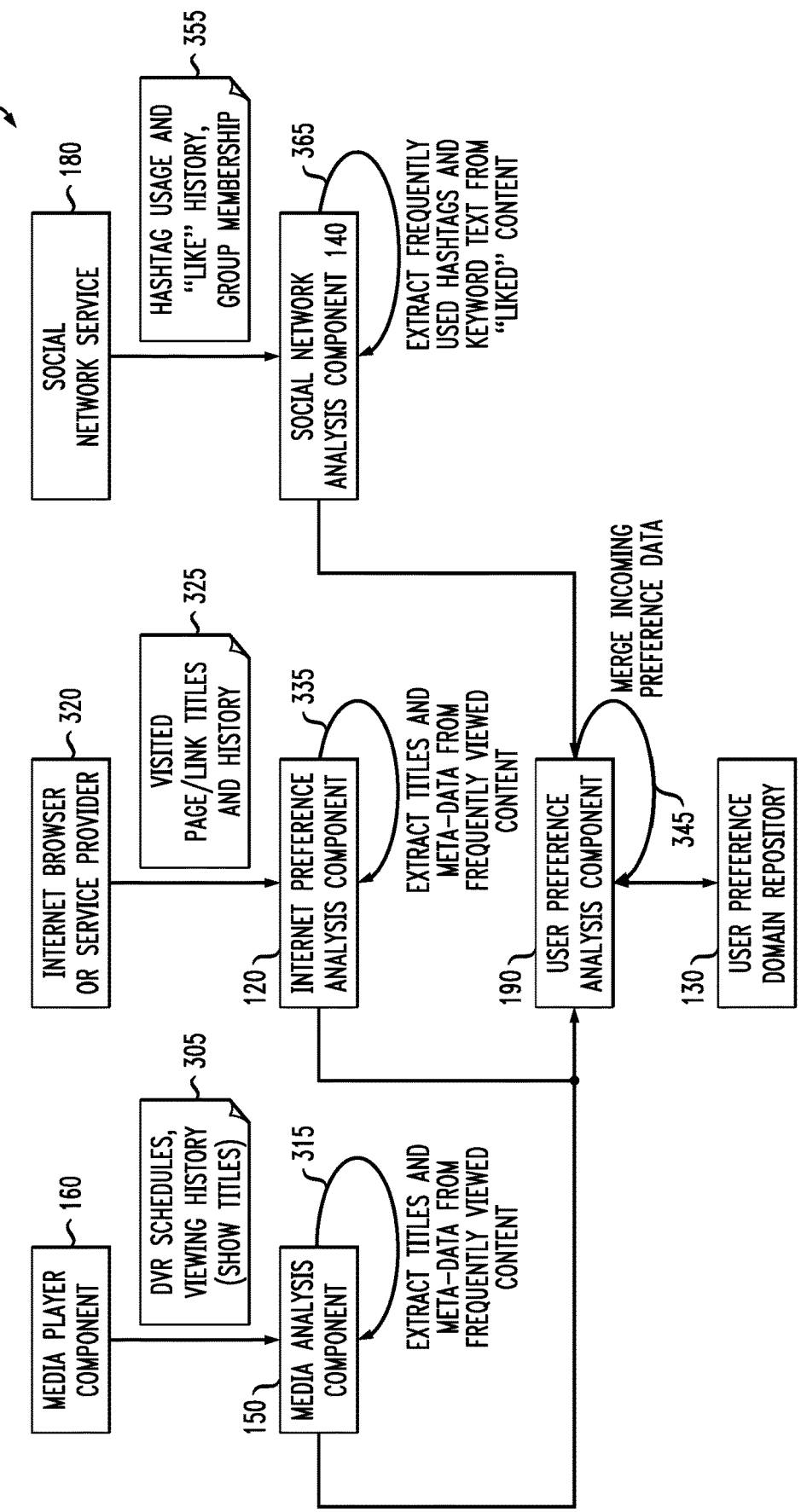
FIG. 3 is a flow chart illustrating an exemplary implementation of a user media preference collection process according to one embodiment of the invention.

FIG. 3 is a flow chart illustrating an exemplary implementation of the user media preference collection process 300 according to one embodiment of the invention. As shown in FIG. 3, the media player component 160 provides DVR schedules and viewing history (e.g., program titles and other metadata) 305 to the media analysis component 150. During step 315, the media analysis component 150 extracts titles and metadata from frequently viewed content of the user.

In addition, the Internet browser or service provider 320 of the Internet 170 provides information (e.g., titles and history) 325 regarding pages and/or hyperlinks visited by the user to the Internet preference analysis component 120. During step 335, the Internet preference analysis component 120 extracts titles and metadata from the frequently viewed/visited content.

In addition, one or more social networks 180 provide social media usage 355, such as hashtag usage, "like" history, and/or group memberships to the social network analysis component 140. During step 365, the social network analysis component 140 extracts frequently used hashtags and keywords from the social media usage 355 (e.g., "liked" content).

As shown in FIG. 3, the media analysis component 150, Internet preference analysis component 120 and social network analysis component 140 provide the extracted information during steps 315, 335 and 365 to the user preference analysis component 190.

During step 345, the user preference analysis component 190 merges incoming preference data, which is then stored in the user preference and domain repository 130.

Figure 4:
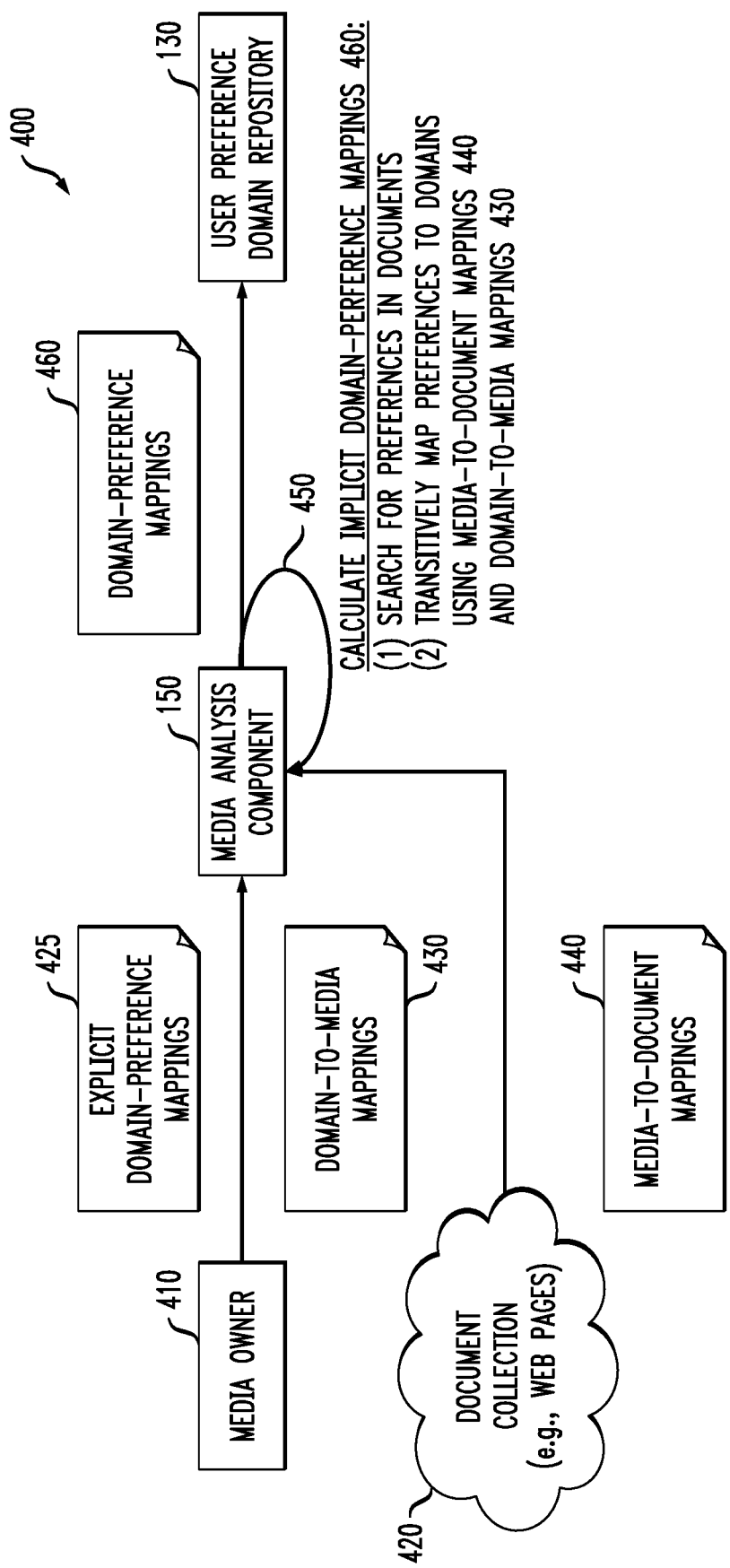
FIG. 4 is a flow chart illustrating an exemplary implementation of a user media domain analysis process according to one embodiment of the invention.

FIG. 4 is a flow chart illustrating an exemplary implementation of a user media domain analysis process 400 according to one embodiment of the invention. As shown in FIG. 4, a media owner 410 provides explicit domain-preference mappings 425 and domain-media mappings 430 to the media analysis component 150. In addition, the media analysis component 150 receives media-document mappings 440 from one or more document collections 420 (such as web pages).

During step 450, the media analysis component 150 calculates implicit domain-preference mappings 460 by searching for preferences in documents; and mapping the preferences in documents to domains using the media-document mappings 440 and domain-media mappings 430.

The media analysis component 150 provides the resulting domain-preference mappings 460 to the user preference and domain repository 130.

In one or more exemplary embodiments, the disclosed techniques for alerting users to events of interest are provided by a media company, the media company can personalize the delivery of media and provide an advantage for satellite or cable providers, for example, facing a growing number of "cord cutters" and/or increased competition from Internet-based media services.

Among other benefits, the disclosed techniques for alerting users to events of interest enable viewing of "recently missed" media content based on user preference settings (e.g., based on social network feeds).

The techniques described herein can also include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques described herein can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
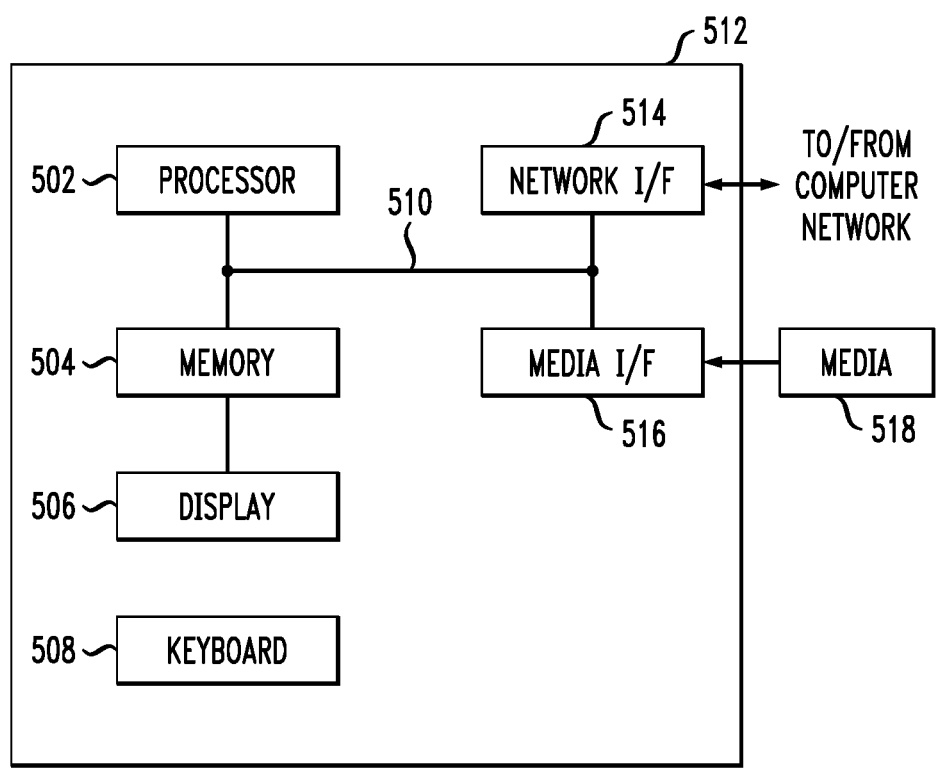
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing an automated media system that alerts user to events of interest using social media analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   monitoring, using at least one processing device, social media of a plurality of users;
   collecting user media preferences indicating events of interest to a given user of the plurality of users, wherein said user media preferences of the given user are collected by evaluating social media activity of the given user in the monitored social media of the plurality of users;
   buffering at least a portion of media content belonging to a media domain of the given user based at least in part on the collected user media preferences for the plurality of users as a surrogate for the given user;
   identifying, using said at least one processing device, at least one media event of interest to the given user within a particular segment of said buffered media content, wherein the identified at least one media event of interest to the given user satisfies one or more predefined interest criteria for the given user based at least in part on (i) contemporaneous social media contributions, with respect to said identified at least one media event, by one or more other users in the monitored social media of the plurality of users and (ii) the collected user media preferences of said given user identified from prior social media activity, with respect to said identified at least one media event, of only the given user from the monitored social media of the plurality of users; and notifying, using said at least one processing device, the given user of the at least one media event of interest within the particular segment.

2. The computer-implemented method of claim 1, wherein said step of monitoring social media further comprises identifying a number of mentions in the monitored social media of a media item that exceeds a predefined posting number threshold.

3. The computer-implemented method of claim 1, further comprising, when the at least one media event of interest to the given user is found with a confidence level that satisfies a predefined confidence threshold, providing the given user with substantially immediate access, with respect to said identifying, to the buffered media content associated with the at least one media event of interest.

4. The computer-implemented method of claim 3, wherein said providing further comprises one or more of sending a link to the given user for the buffered media content associated with the at least one media event of interest and embedding the buffered media content associated with the at least one media event of interest in one or more of an alert and a pop-up window on a display based at least in part on a user-specified preference.

5. The computer-implemented method of claim 1, wherein the one or more predefined interest criteria comprises one or more of a host of a television program that includes the at least one media event raising his or her voice in an excited manner above a predefined volume threshold; a volume of crowd noise relating to the at least one media event exceeding a predefined noise threshold; a number of social media posts about the at least one media event exceeding a predefined posting number threshold;

one or more predefined keywords occurring about the media event; and a predefined action occurring involving a particular person or group.

6. The computer-implemented method of claim 1, wherein the social media contributions by the one or more other users in the monitored social media occur contemporaneously with the at least one media event of interest to the given user.

7. The computer-implemented method of claim 1, further comprising refining one or more of the predefined interest criteria for the given user and the collected user media preferences of the given user based at least in part on feedback from the given user.

8. A computer program product comprising a non-transitory computer readable storage medium having program instructions embodied therewith, the program instructions executable by at least one processing device to cause the at least one processing device to:

monitoring, using at least one processing device, social media of a plurality of users;

collecting user media preferences indicating events of interest to a given user of the plurality of users, wherein said user media preferences of the given user are collected by evaluating social media activity of the given user in the monitored social media of the plurality of users;

buffering at least a portion of media content belonging to a media domain of the given user based at least in part on the collected user media preferences for the plurality of users as a surrogate for the given user;

identifying, using said at least one processing device, at least one media event of interest to the given user within a particular segment of said buffered media content, wherein the identified at least one media event of interest to the given user satisfies one or more predefined interest criteria for the given user based at least in part on (i) contemporaneous social media contributions, with respect to said identified at least one media event, by one or more other users in the monitored social media of the plurality of users and (ii) the collected user media preferences of said given user identified from prior social media activity, with respect to said identified at least one media event, of only the given user from the monitored social media of the plurality of users; and notifying, using said at least one processing device, the given user of the at least one media event of interest within the particular segment.

9. The computer program product of claim 8, wherein said social media are monitored by identifying a number of mentions in the monitored social media of a media item that exceeds a predefined posting number threshold.

10. The computer program product of claim 8, wherein the given user is provided, when the at least one media event of interest to the given user is found with a confidence level that satisfies a predefined confidence threshold, with substantially immediate access, with respect to said identifying, to the buffered media content associated with the at least one media event of interest by one or more of sending a link to the given user for the buffered media content associated with the at least one media event of interest and embedding the buffered media content associated with the at least one media event of interest in one or more of an alert and a pop-up window on a display based at least in part on a user-specified preference.

11. The computer program product of claim 8, wherein the one or more predefined interest criteria comprises one or more of a host of a television program that includes the at least one media event raising his or her voice in an excited manner above a predefined volume threshold; a volume of crowd noise relating to the at least one media event exceeding a predefined noise threshold; a number of social media posts about the at least one media event exceeding a predefined posting number threshold; one or more predefined keywords occurring about the media event; and a predefined action occurring involving a particular person or group.

12. The computer program product of claim 8, wherein the social media contributions by the one or more other users in the monitored social media occur contemporaneously with the at least one media event of interest to the given user.

13. The computer program product of claim 8, further comprising refining one or more of the predefined interest criteria for the given user and the collected user media preferences of the given user based at least in part on feedback from the given user.

14. A system comprising:

a memory; and at least one processor coupled to the memory and configured for:

monitoring, using at least one processing device, social media of a plurality of users;

collecting user media preferences indicating events of interest to a given user of the plurality of users, wherein said user media preferences of the given user are collected by evaluating social media activity of the given user in the monitored social media of the plurality of users;

buffering at least a portion of media content belonging to a media domain of the given user based at least in part on the collected user media preferences for the plurality of users as a surrogate for the given user;

identifying, using said at least one processing device, at least one media event of interest to the given user within a particular segment of said buffered media content, wherein the identified at least one media event of interest to the given user satisfies one or more predefined interest criteria for the given user based at least in part on (i) contemporaneous social media contributions, with respect to said identified at least one media event, by one or more other users in the monitored social media of the plurality of users and (ii) the collected user media preferences of said given user identified from prior social media activity, with respect to said identified at least one media event, of only the given user from the monitored social media of the plurality of users; and notifying, using said at least one processing device, the given user of the at least one media event of interest within the particular segment.

15. The system of claim 14, wherein said social media are monitored by identifying a number of mentions in the monitored social media of a media item that exceeds a predefined posting number threshold.

16. The system of claim 14, wherein the given user is provided, when the at least one media event of interest to the given user is found with a confidence level that satisfies a predefined confidence threshold, with substantially immediate access, with respect to said identifying, to the buffered media content associated with the at least one media event of interest by one or more of sending a link to the given user for the buffered media content associated with the at least one media event of interest and embedding the buffered media content associated with the at least one media event of interest in one or more of an alert and a pop-up window on a display based at least in part on a user-specified preference.

17. The system of claim 14, wherein the one or more predefined interest criteria comprises one or more of a host of a television program that includes the at least one media event raising his or her voice in an excited manner above a predefined volume threshold; and a volume of crowd noise relating to the at least one media event exceeding a predefined noise threshold.

18. The system of claim 14, wherein the social media contributions by the one or more other users in the monitored social media occur contemporaneously with the at least one media event of interest to the given user.

19. The system of claim 14, further comprising refining one or more of the predefined interest criteria for the given user and the collected user media preferences of the given user based at least in part on feedback from the given user.

20. The system of claim 14, wherein the one or more predefined interest criteria comprises one or more of a number of social media posts about the at least one media event exceeding a predefined posting number threshold; and one or more predefined keywords occurring about the media event; and a predefined action occurring involving a particular person or group.

* * * * *